United States Patent
Sobel et al.

(10) Patent No.: US 10,528,736 B1
(45) Date of Patent: Jan. 7, 2020

(54) SYSTEMS AND METHODS FOR DETECTING PREPARATORY-STAGES OF ROWHAMMER ATTACKS

(71) Applicant: Symantec Corporation, Mountain View, CA (US)

(72) Inventors: William E. Sobel, Jamul, CA (US); Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 198 days.

(21) Appl. No.: 15/471,642

(22) Filed: Mar. 28, 2017

(51) Int. Cl.
| | |
|---|---|
| *H04L 29/06* | (2006.01) |
| *G06F 21/56* | (2013.01) |
| *G06F 12/14* | (2006.01) |
| *G06F 9/4401* | (2018.01) |
| *G06F 21/53* | (2013.01) |

(52) U.S. Cl.
CPC ............ *G06F 21/566* (2013.01); *G06F 9/442* (2013.01); *G06F 12/1433* (2013.01); *G06F 21/53* (2013.01); *G06F 2212/1052* (2013.01); *G06F 2221/2149* (2013.01)

(58) Field of Classification Search
CPC . G06F 21/56; G06F 9/44; G06F 12/14; G06F 21/53
See application file for complete search history.

(56) References Cited

U.S. PATENT DOCUMENTS

2017/0117030 A1* 4/2017 Fisch .................... G11C 11/406

OTHER PUBLICATIONS

Kaveh Razavi, "Flip Feng Shui:Hammering a needle in the software stack", Aug. 10-12, 2016, pp. 1-14 (Year: 2016).*
Ferdinand Brasser, "Can't touch this: Practical and generic software-only defenses against rowhammer", Dec. 7, 2017, pp. 1-15 (Year: 2016).*
Keun Soo Yim, "The rowhammer attack injection methodology", 2016, pp. 1-10 (Year: 2016).*

* cited by examiner

*Primary Examiner* — Wasika Nipa
(74) *Attorney, Agent, or Firm* — FisherBroyles, LLP

(57) ABSTRACT

The disclosed computer-implemented method for detecting preparatory-stages of rowhammer attacks may include (i) receiving, at a computing device, signatures of preparatory behaviors that are known to be exhibited by malicious virtual machines during preparatory stages of rowhammer attacks, (ii) monitoring, at the computing device, behaviors of a virtual machine that is hosted by the computing device, (iii) detecting, at the computing device while monitoring behaviors of the virtual machine, a behavior that matches one of the signatures of preparatory behaviors, and (iv) performing, in response to detecting the behavior that matches one of the signatures of preparatory behaviors, a security action to prevent the virtual machine from perpetrating a successful rowhammer attack. Various other methods, systems, and computer-readable media are also disclosed.

20 Claims, 7 Drawing Sheets

SYSTEMS AND METHODS FOR DETECTING PREPARATORY-STAGES OF ROWHAMMER ATTACKS

BACKGROUND

Today, many computational workloads are performed by virtual machines in shared-computing environments (e.g., cloud-computing environments). In typical shared-computing environments, several virtual machines may run in isolation from one another yet use the same physical resources. The sharing of physical resources by virtual machines often results in significant reductions in the amount of physical resources (e.g., physical hardware, rack space, and cooling) that must be allocated to run many conventional computational workloads.

In a typical shared-computing environment, virtual machines may be allocated virtual memory in amounts that exceed the amount of available physical memory (a concept that is often referred to as memory overcommitment). Overcommitment of memory may be possible since (i) a typical virtual machine does not use all the virtual memory that has been allocated to it and (ii) unused virtual memory may not consume physical memory. Overcommitment of memory may also be possible because one or more pages of virtual memory of two or more virtual machines may, in some circumstances, share or be mapped to the same page frame in physical memory.

In many shared-computing environments, virtual machines often execute the same operating systems, run the same applications, and/or process the same data such that one or more pages of virtual memory of the virtual machines may contain identical data. To reduce the amount of physical memory that is used by the virtual machines, some shared-computing environments may monitor physical memory for identical page frames and, when identical page frames are detected, de-duplicate the identical page frames by (i) retaining one of the page frames as read-only memory, (ii) remapping the pages of virtual memory that were mapped to the other page frames to the retained page frame, and (iii) releasing the other page frames. If a virtual machine attempts to write data to a page of virtual memory that is backed by a shared page frame in physical memory, a typical shared-computing environment may use a copy-on-write mechanism that remaps the page of virtual memory to a new duplicate page frame in physical memory before committing the virtual machine's write to physical memory.

Unfortunately, recent discoveries of the Rowhammer dynamic random-access memory (DRAM) bug that plagues some types of physical memory and its associated exploits (e.g., Flip Feng Shui) have caused many shared-computing providers to forgo physical-memory de-duplication. The Rowhammer DRAM bug generally refers to a hardware bug that plagues certain types of DRAM whose row-based configurations are flawed in such a way that repeated read accesses from one physical row of memory may induce bit flips (i.e., single bit errors) in adjacent physical rows of memory. Malicious attacks based on this flaw are often referred to as rowhammer attacks. In conventional shared-computing environments, a malicious virtual machine may use a rowhammer attack to induce a bit flip in a page of virtual memory of a target virtual machine that is mapped to a shared page frame and that contains data that is sensitive to bit flips. The instant disclosure, therefore, identifies and addresses a need for systems and methods for detecting rowhammer attacks.

SUMMARY

As will be described in greater detail below, the instant disclosure describes various systems and methods for detecting preparatory-stages of rowhammer attacks. In one example, a method for detecting preparatory-stages of rowhammer attacks may include (i) receiving, at a computing device, signatures of preparatory behaviors that are known to be exhibited by malicious virtual machines during preparatory stages of rowhammer attacks, (ii) monitoring, at the computing device, behaviors of a virtual machine that is hosted by the computing device, (iii) detecting, at the computing device while monitoring behaviors of the virtual machine, a behavior that matches one of the signatures of preparatory behaviors, and (iv) performing, in response to detecting the behavior that matches one of the signatures of preparatory behaviors, a security action to prevent the virtual machine from perpetrating a successful rowhammer attack.

In some examples, the signatures of preparatory behaviors may include signatures of preparatory behaviors that are known to be exhibited by malicious virtual machines during preparatory stages of flip-feng-shui (FFS) attacks. In various other examples, the signatures of preparatory behaviors may include (i) a signature of controlling a layout of page frames in physical memory in a way that is known to enable malicious virtual machines to perpetrate rowhammer attacks, (ii) a signature of mapping a page frame in physical memory to a page of virtual memory in a way that is known to enable malicious virtual machines to perpetrate rowhammer attacks, (iii) a signature of reading from a page of virtual memory in a way that is known to enable malicious virtual machines to identify portions of physical memory that are vulnerable to bit flipping, (iv) a signature of reading from a page of virtual memory in a way that is known to enable malicious virtual machines to identify an alignment of a page frame of physical memory within physical memory, (v) a signature of aligning a page frame of physical memory to physical memory in a way that is known to enable malicious virtual machines to perpetrate rowhammer attacks, (vi) a signature of making a page frame of physical memory more likely to be shared with other virtual machines, (vii) a signature of writing to a page of virtual memory in a way that is known to enable a malicious virtual machine to maintain control of a page frame of physical memory, and/or (viii) a signature of causing page frames to be allocated continuously in physical memory.

In some examples, the step of performing the security action may include (i) flagging the virtual machine as a possible perpetrator of a rowhammer attack, (ii) flagging the virtual machine for forensic examination, (iii) shutting down the virtual machine, (iv) preventing the virtual machine from sharing page frames with any other virtual machine, and/or (v) assigning the virtual machine to a group of untrusted virtual machines that cannot share page frames with trusted virtual machines.

In one embodiment, a system for detecting preparatory-stages of rowhammer attacks may include several modules stored in memory, including (i) a receiving module that receives, at a hypervisor, signatures of preparatory behaviors that are known to be exhibited by malicious virtual machines during preparatory stages of rowhammer attacks, (ii) a monitoring module that monitors, at the hypervisor, behaviors of a virtual machine that is hosted by the hypervisor, (iii) a detecting module that detects at the hypervisor while monitoring behaviors of the virtual machine, a behavior that matches one of the signatures of preparatory behaviors, and (iv) a security module that performs, in response to detecting the behavior that matches one of the signatures of preparatory behaviors, a security action to prevent the virtual machine from perpetrating a successful rowhammer attack. In at least one example, the system may also include at least one physical processor that executes the receiving module, the monitoring module, the detecting module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) receive, at the computing device, signatures of preparatory behaviors that are known to be exhibited by malicious virtual machines during preparatory stages of rowhammer attacks, (ii) monitor, at the computing device, behaviors of a virtual machine that is hosted by the computing device, (iii) detect, at the computing device while monitoring behaviors of the virtual machine, a behavior that matches one of the signatures of preparatory behaviors, and (iv) perform, in response to detecting the behavior that matches one of the signatures of preparatory behaviors, a security action to prevent the virtual machine from perpetrating a successful rowhammer attack.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
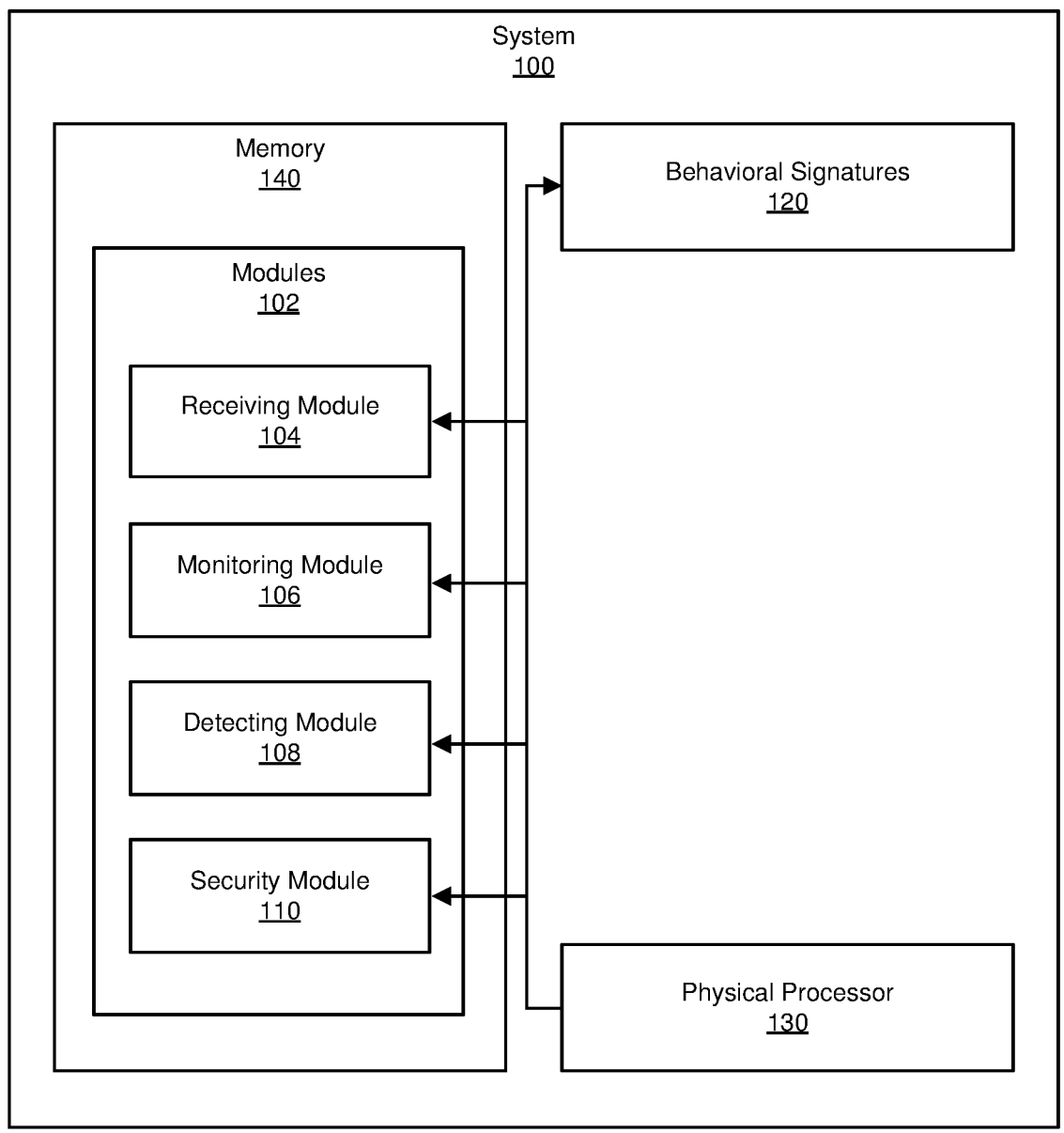
FIG. 1 is a block diagram of an example system for detecting preparatory-stages of rowhammer attacks.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for detecting preparatory-stages of rowhammer attacks. As will be explained in greater detail below, by monitoring how virtual machines interact with virtual memory for behaviors that may indicate that the virtual machines are preparing to perpetrate rowhammer attacks, the systems and methods described herein may enable the detection of rowhammer attacks during their early preparatory stages. Furthermore, in some examples, by detecting rowhammer attacks during their preparatory stages, these systems and methods may perform various security actions that may prevent the rowhammer attacks from succeeding. Moreover, by detecting and preventing rowhammer attacks, the systems and methods described herein may enable memory de-duplication in shared-computing environments whose physical memory may be affected by the rowhammer DRAM bug.

In addition, the systems and methods described herein may improve the functioning of a computing device (e.g., a hypervisor) by enabling the computing device to safely de-duplicate page frames in physical memory and thus reducing the amount of physical memory that is consumed by the computing device at any given time. These systems and methods may also improve the field of virtualized computing by reducing the amount of physical memory that is needed to safely and securely host virtual machines in shared-computing environments. Embodiments of the instant disclosure may also provide various other advantages and features, as discussed in greater detail below.

The following will provide, with reference to FIGS. 1-4, detailed descriptions of example systems for detecting preparatory-stages of rowhammer attacks. Detailed descriptions of corresponding computer-implemented methods will also be provided in connection with FIG. 5. In addition, detailed descriptions of an example computing system and network architecture capable of implementing one or more of the embodiments described herein will be provided in connection with FIGS. 6 and 7, respectively.

FIG. 1 is a block diagram of an example system 100 for detecting preparatory-stages of rowhammer attacks. As illustrated in this figure, example system 100 may include one or more modules 102 for performing one or more tasks. As will be explained in greater detail below, modules 102 may include a receiving module 104, a monitoring module 106, a detecting module 108, and a security module 110. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as computing device 202 illustrated in FIG. 2. One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate detecting preparatory-stages of rowhammer attacks. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor. As illustrated in FIG. 1, example system 100 may also include one or more behavioral signatures, such as behavioral signatures 120.

Figure 2:
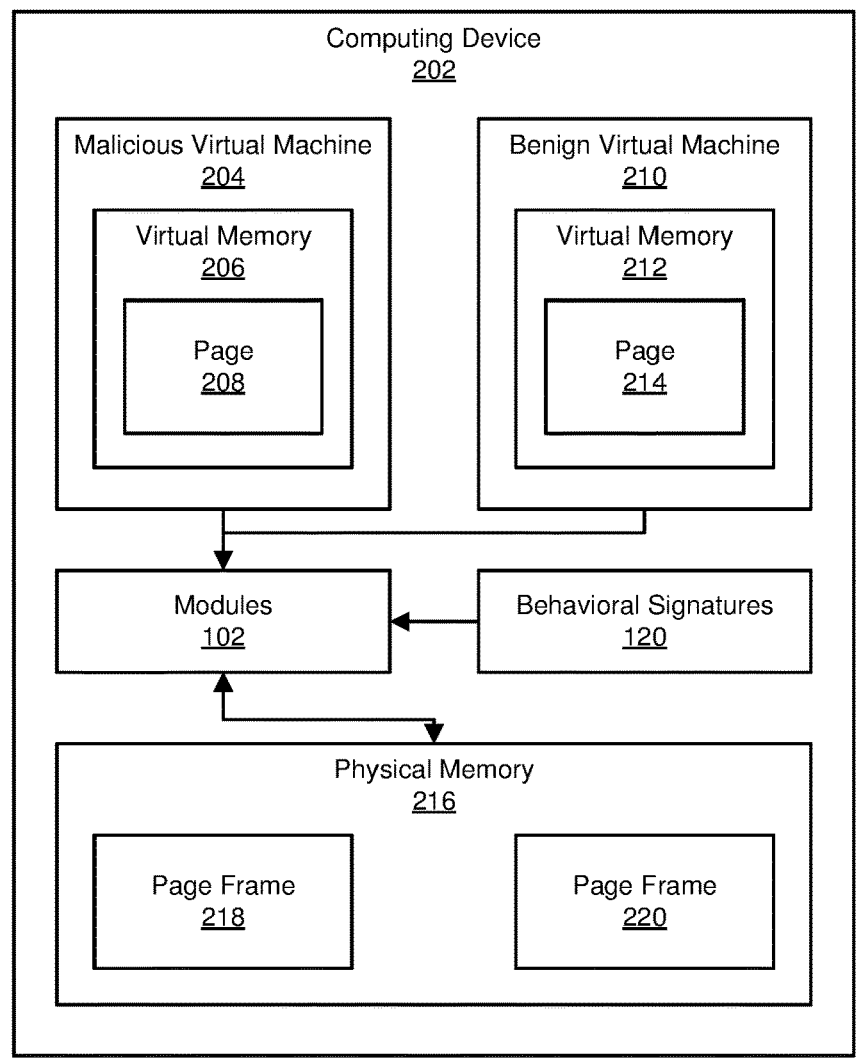
FIG. 2 is a block diagram of an additional example system for detecting preparatory-stages of rowhammer attacks.

Example system 100 in FIG. 1 may be implemented in a variety of ways. For example, all or a portion of example system 100 may represent portions of example shared-computing system 200 in FIG. 2. As shown in FIG. 2, system 200 may include a computing device 202. In one example, all or a portion of the functionality of modules 102 may be performed by computing device 202 and/or any other suitable computing system. As will be described in greater detail below, one or more of modules 102 from FIG. 1 may, when executed by at least one processor of computing device 202, enable computing device 202 to detect rowhammer attacks. For example, and as will be described in greater detail below, one or more of modules 102 may cause computing device 202 to (i) receive, at computing device 202, behavioral signatures 120 that include signatures of preparatory behaviors that are known to be exhibited by malicious virtual machines during preparatory stages of rowhammer attacks, (ii) monitor, at computing device 202, behaviors of a malicious virtual machine 204 and a benign virtual machine 210 that are hosted by computing device 202, (iii) detect, at computing device 202 while monitoring behaviors of malicious virtual machine 204 and benign virtual machine 210, a behavior of malicious virtual machine 204 that matches one of behavioral signatures 120, and (iv) perform, in response to detecting the behavior of malicious virtual machine 204 that matches one of behavioral signatures 120, a security action to prevent malicious virtual machine 204 from perpetrating a successful rowhammer attack.

Computing device 202 generally represents any type or form of computing device capable of reading computer-executable instructions. In one example, computing device 202 may represent a hypervisor. As used herein, the term "hypervisor" generally refers to any type or form of virtualization platform capable of running and/or managing multiple virtual machines on a single physical computing device. Examples of hypervisors include, without limitation, VMWARE ESX/ESXI, MICROSOFT HYPER-V, ORACLE VM, SUN VIRTUALBOX, CITRIX XEN-SERVER, any bare-metal hypervisor, and/or any hosted hypervisor. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device on which memory de-duplication may be performed. Additional examples of computing device 202 include, without limitation, security servers, application servers, web servers, storage servers, and/or database servers configured to run certain software applications and/or provide various security, web, storage, and/or database services. Although illustrated as a single entity in FIG. 2, computing device 202 may include and/or represent a plurality of computing devices that work and/or operate in conjunction with one another.

As shown in FIG. 2, computing device 202 may be configured to host multiple virtual machines, such as virtual machine 204 and virtual machine 210. Virtual machines 204 and 210 generally represent any virtualization (including hardware-assisted virtualization), implementation, or emulation of a physical computing device. Examples of virtual machines 204 and 210 include, without limitation, system virtual machines and process virtual machines.

Figure 3:
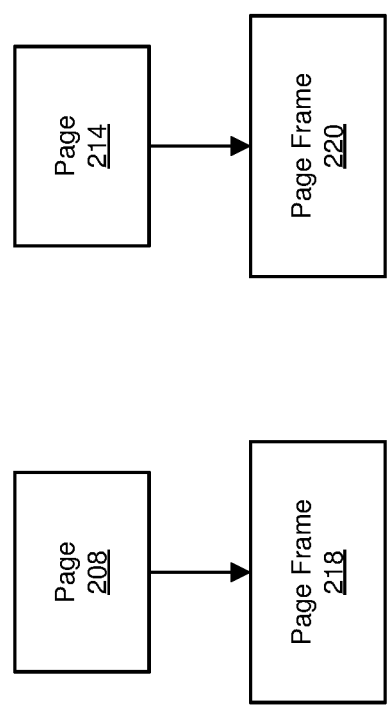
FIG. 3 is a block diagram of an example mapping of virtual memory pages to physical memory.

As shown in FIG. 2, computing device 202 may also include physical memory 216. Physical memory 216 generally represents any type of form of physical computing memory that has the rowhammer DRAM bug or is vulnerable to bit flipping. In some examples, computing device 202 may enable virtual machines to use physical memory 216 by allocating virtual memory (i.e., a virtual address space), which is backed by physical memory 216, for each of the virtual machines that it hosts. For example, computing device 202 may allocate virtual memory 206 for virtual machine 204 and virtual memory 212 for virtual machine 210. Computing device 202 may manage the storage of data to virtual memory using pages, such as page 208 and page 214. As used herein, the terms "page" and "page of virtual memory" generally refer to any contiguous block of virtual memory. A page of virtual memory may be mapped to a page frame of physical memory and may be transferred between physical memory and external page storage when not needed. When a virtual machine reads data from or writes data to a page of virtual memory, computing device 202 may read the data from or write the data to the page frame to which the page of virtual memory has been mapped. The term "page frame" as used herein, generally refers to any contiguous block of physical memory or a unit of storage of physical memory that is used to store a virtual-memory page in active memory. FIG. 3 illustrates how page 208 and page 214 may be initially mapped to physical memory 216. In this example, page 208 may be stored to page frame 218, and page 214 may be stored to page frame 220.

Figure 4:
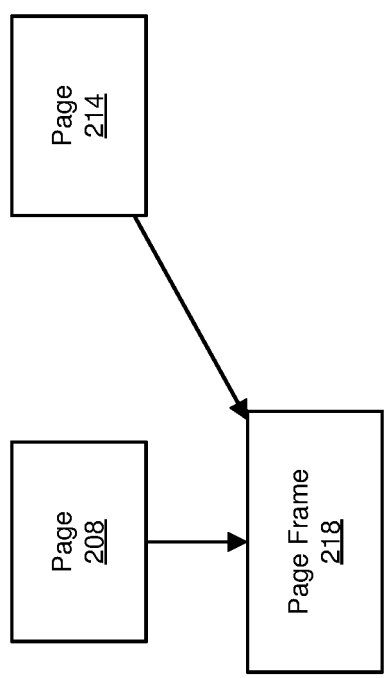
FIG. 4 is a block diagram of an example mapping of virtual memory pages to physical memory.

In some situations, two or more virtual machines may have pages of virtual memory that contain identical data. For example, in some situations, page 208 and page 214 may contain identical data. In these situations, the page frames of physical memory that store the pages of virtual memory may also store identical data, and computing device 202 may perform memory de-duplication in order to reduce the amount of physical memory that is utilized. As used herein, the term "de-duplication" generally refers to the process of reducing redundant data in physical memory by mapping or backing pages of virtual memory that store identical data to a single page frame in physical memory. FIG. 4 illustrates how page 208 and page 214, which contain identical data, may be stored in physical memory 216 after de-duplication is performed on physical memory 216 as shown in FIG. 3.

In this example, page 214 may be remapped to page frame 218 such that page 208 and page 214 share page frame 218. In this example, computing device 202 may mark page frame 218 as read-only memory when page frame 218 is shared.

Figure 5:
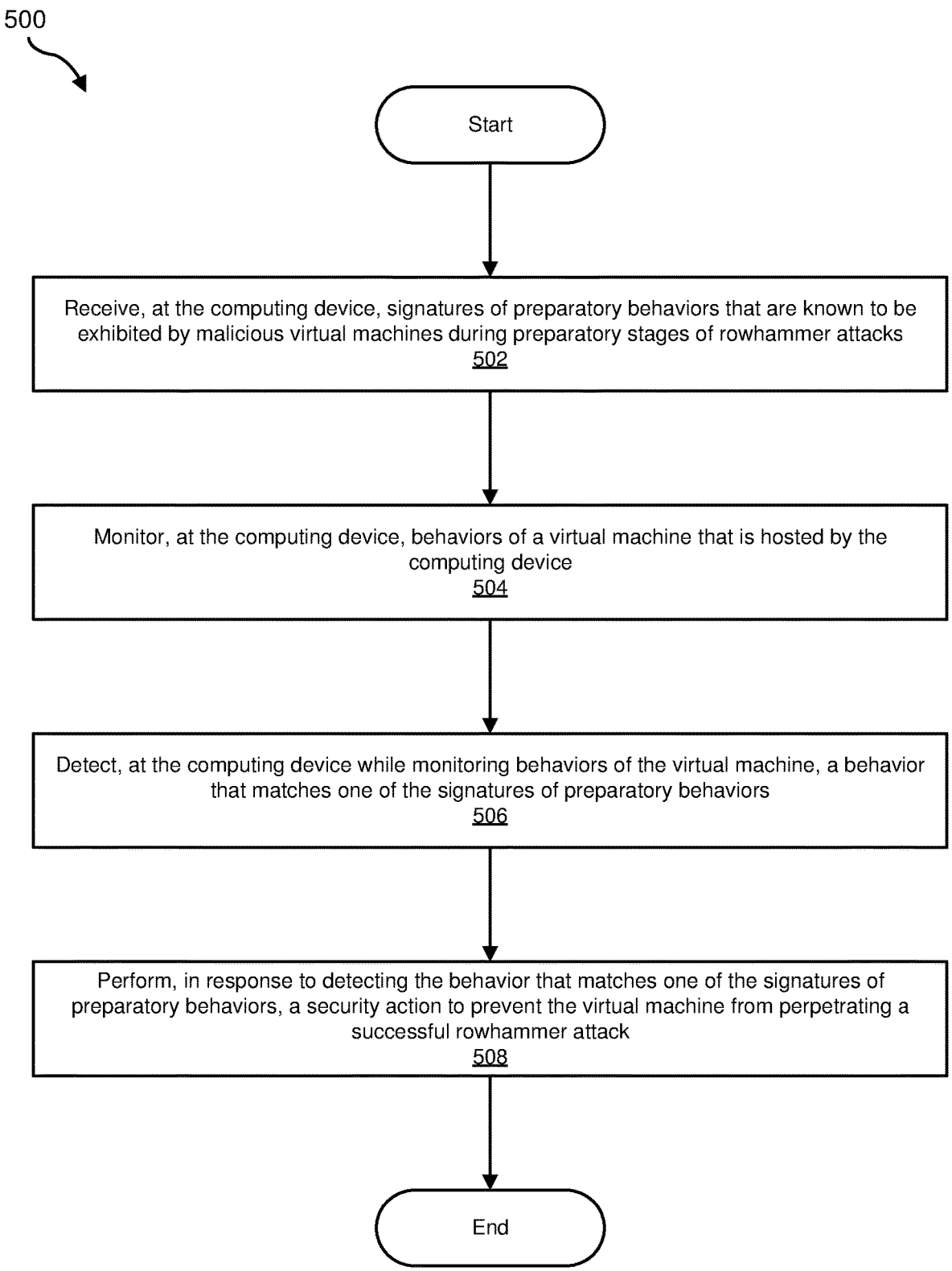
FIG. 5 is a flow diagram of an example method for detecting preparatory-stages of rowhammer attacks.

FIG. 5 is a flow diagram of an example computer-implemented method 500 for detecting preparatory-stages of rowhammer attacks. The steps shown in FIG. 5 may be performed by any suitable computer-executable code and/or computing system, including system 100 in FIG. 1, system 200 in FIG. 2, and/or variations or combinations of one or more of the same. In one example, each of the steps shown in FIG. 5 may represent an algorithm whose structure includes and/or is represented by multiple sub-steps, examples of which will be provided in greater detail below.

As illustrated in FIG. 5, at step 502 one or more of the systems described herein may receive, at a computing device, signatures of preparatory behaviors that are known to be exhibited by malicious virtual machines during preparatory stages of rowhammer attacks. For example, receiving module 104 may, as part of computing device 202 in FIG. 2, receive behavioral signatures 120.

In general, receiving module 104 may receive signatures of various preparatory behaviors that are known to be exhibited by malicious virtual machines during the preparatory stages of rowhammer attacks from a security service that discovers the preparatory behaviors and/or maintains the signatures. As used herein, the term "signature" generally refers to any unique information that identifies or describes the patterns, timings, and/or other characteristics of the behaviors that may be exhibited by a malicious virtual machine that is preparing to perpetrate a rowhammer attack. As used herein, the term "preparatory behavior" generally refers to any behavior or action or combination of behaviors or actions that a malicious virtual machine may perform during the preparatory stages of a rowhammer attack. A typical rowhammer attack may have several preparatory stages or phases. Examples of preparatory stages of rowhammer attacks include, without limitation, a templating stage during which locations in physical memory that are vulnerable to bit flipping are discovered and a memory-massaging stage during which sensitive data of a target virtual machine is aligned to the locations in physical memory that are vulnerable to bit flipping.

In a typical shared-computing environment, a benign virtual machine typically does not care how its virtual memory is allocated in or mapped to physical memory. However before perpetrating a successful rowhammer attack, a malicious virtual machine may need to control and/or understand how its virtual memory is allocated in or mapped to physical memory in order to (i) discover locations in physical memory that are vulnerable to bit flipping and (ii) align sensitive data of a target virtual machine to the identified locations. As such, a malicious virtual machine may exhibit various unique and identifiable preparatory behaviors while attempting to accomplish these tasks that may indicate that the malicious virtual machine is preparing to perpetrate a rowhammer attack. The following describes several exemplary preparatory behaviors that a malicious virtual machine may perform while preparing to perpetrate a rowhammer attack.

One of the first preparatory behaviors that may be exhibited by a malicious virtual machine when preparing for a rowhammer attack may include controlling how its virtual memory is allocated in or mapped to physical memory. In some examples, a malicious virtual machine may attempt to ensure that its pages of virtual memory remain mapped to the same page frames in physical memory and not remapped to other page frames as part of memory de-duplication by (i) allocating, as soon as the malicious virtual machine starts, a single buffer that is or is nearly the same size as the malicious virtual machine's available virtual memory and (ii) immediately writing a unique value to each page of its virtual memory as soon as the buffer is allocated to the virtual machine. By allocating a single buffer that is or is nearly the same size as the malicious virtual machine's available virtual memory as soon as the malicious virtual machine starts, a malicious virtual machine may cause the buffer to be allocated continuously in physical memory (e.g., since the buffer may be backed by transparent huge pages). By writing unique values to the pages of its virtual memory, a malicious virtual machine may retain control of the page frames to which its pages of virtual memory are mapped since they are likely to be unique and not likely to be involved in memory de-duplication.

In order to discover locations in physical memory that are vulnerable to bit flipping using rowhammering or double-sided rowhammering techniques, a malicious virtual machine may need to quickly read from portions of its virtual memory that are mapped to specific rows of physical memory. As such, the malicious virtual machine may need to know how the page frames in physical memory that back its virtual memory are aligned to rows in physical memory. In one example, a malicious virtual machine may ensure that the page frames in physical memory that back its virtual memory are aligned to rows in physical memory by requesting that the page frames be aligned to the rows in physical memory. In at least one example, a malicious virtual machine may request that the page frames be aligned to the rows in physical memory by requesting that the page frames be aligned to two megabyte boundaries, which may be aligned to the rows in physical memory. In some examples, a malicious virtual machine may learn how the page frames in physical memory that back its virtual memory are aligned to rows in physical memory by sequentially reading from virtual memory and by monitoring how long each read attempt takes. In some situations, a read from a boundary in physical memory, which may be aligned to the rows in physical memory, may take longer than reads from other portions of physical memory.

In some environments, a page frame that is already shared by multiple pages of virtual memory may be more likely shared with other pages of virtual memory. For at least this reason, a malicious virtual machine may cause one of the page frames that it controls to be more likely shared with a target virtual machine by storing the same data to two of its own pages of virtual memory (i.e., a page of virtual memory that is mapped to the controlled page frame and another page of virtual memory that is mapped to another page frame). When memory de-duplication is run, the controlled page frame may be shared by two pages of the malicious virtual machine's virtual memory and more likely to be shared with pages of virtual memory of other virtual machines.

Once a malicious virtual machine controls and/or understands how its virtual memory is allocated in or mapped to physical memory, the malicious virtual machine may exhibit various additional preparatory behaviors while (i) discovering locations in physical memory that are vulnerable to bit flipping and (ii) aligning sensitive data of a target virtual machine to the identified locations. For example, a malicious virtual machine may discover locations in physical memory that are vulnerable to bit flipping by using a suitable row-hammering or double-sided rowhammering technique to induce bit flips in physical memory and by recording the location of any induced flipped bits.

After a malicious virtual machine identifies locations in a controlled page frame of physical memory that are vulnerable to bit flipping, the virtual machine may attempt to map a page of virtual memory of a target virtual machine that contains sensitive data to the controlled page frame so that bit flips may be induced in the page of virtual memory of the target virtual machine. In one example, the malicious virtual machine may map the page of virtual memory of the target virtual machine to the controlled page frame by (i) storing the contents of the page of virtual memory of the target virtual machine to a page of the malicious virtual machine's virtual memory that is mapped to the controlled page frame and (ii) waiting for memory de-duplication to remap the page of virtual memory of the target virtual machine to the controlled page frame.

At step 504, one or more of the systems described herein may monitor, at the computing device, behaviors of a virtual machine that is hosted by the computing device. For example, monitoring module 106 may, as part of computing device 202 in FIG. 2, monitor behaviors of malicious virtual machine 204 and benign virtual machine 210 that are hosted by computing device 202.

The systems described herein may monitor the behaviors of a virtual machine in any suitable manner that enables the detection of the preparatory behaviors described in the signatures received at step 502. For example, monitoring module 106 may monitor when and how a virtual machine allocates its virtual memory, when and how the virtual machine reads from its virtual memory, and/or when and how the virtual machine writes to its virtual memory.

At step 506, one or more of the systems described herein may detect, at the computing device while monitoring behaviors of the virtual machine, a behavior that matches one of the signatures of preparatory behaviors. For example, detecting module 108 may, as part of computing device 202 in FIG. 2, detect, while monitoring behaviors of malicious virtual machine 204 and benign virtual machine 210, a behavior of malicious virtual machine 204 that matches one of behavioral signatures 120. In general, the systems described herein may detect the preparatory stage of a rowhammer attack by detecting one or more of the preparatory behaviors described in the signatures received at step 502.

At step 508, one or more of the systems described herein may perform, in response to detecting the behavior that matches one of the signatures of preparatory behaviors, a security action to prevent the virtual machine from perpetrating a successful rowhammer attack. For example, security module 110 may, as part of computing device 202 in FIG. 2, perform, in response to detecting the behavior of malicious virtual machine 204 that matches one of behavioral signatures 120, a security action to prevent malicious virtual machine 204 from perpetrating a successful rowhammer attack.

The systems described herein may perform a variety of security actions in response to the detection of a preparatory behavior of a rowhammer attack. In one example, security module 110 may attempt to prevent rowhammer attacks from continuing or succeeding by shutting down any virtual machine that exhibits preparatory behaviors of rowhammer attacks. Alternatively, security module 110 may allow a virtual machine that exhibits preparatory behaviors of rowhammer attacks to continue to run but may carefully monitor the virtual machine for additional rowhammer-attack behaviors. In one example, if the virtual machine exhibits any additional rowhammer-attack behaviors, security module 110 may shut down the virtual machine.

In some examples, security module 110 may attempt to prevent a rowhammer attack from continuing or succeeding by remapping pages of virtual memory of any virtual machine that exhibits preparatory behaviors of rowhammer attacks to unshared page frames. In some examples, security module 110 may prevent rowhammer attacks by preventing any virtual machine that exhibits preparatory behaviors of rowhammer attacks from subsequently sharing physical memory with any other virtual machine (e.g., by assigning each virtual machine to a group of untrusted virtual machines that cannot share physical memory with other more trusted virtual machines).

In some examples, security module 110 may flag any virtual machine that exhibits preparatory behaviors of rowhammer attacks as a possible perpetrator and/or flag the virtual machine for further forensic examination. Upon completion of step 508, exemplary method 500 in FIG. 5 may terminate.

As explained above, by monitoring how virtual machines interact with virtual memory for behaviors that may indicate that the virtual machines are preparing to perpetrate rowhammer attacks, the systems and methods described herein may enable the detection of rowhammer attacks during their early preparatory stages. For example, the systems and methods disclosed herein may detect a FFS attack by a malicious virtual machine by detecting that the malicious virtual machine, immediately upon boot, (i) requests that memory allocations be aligned on two megabyte boundaries, (ii) allocates a single buffer that is nearly the same size as the available memory of the virtual machine, and/or (iii) writes unique integers at pre-determined locations within pages of the allocated buffer.

Figure 6:
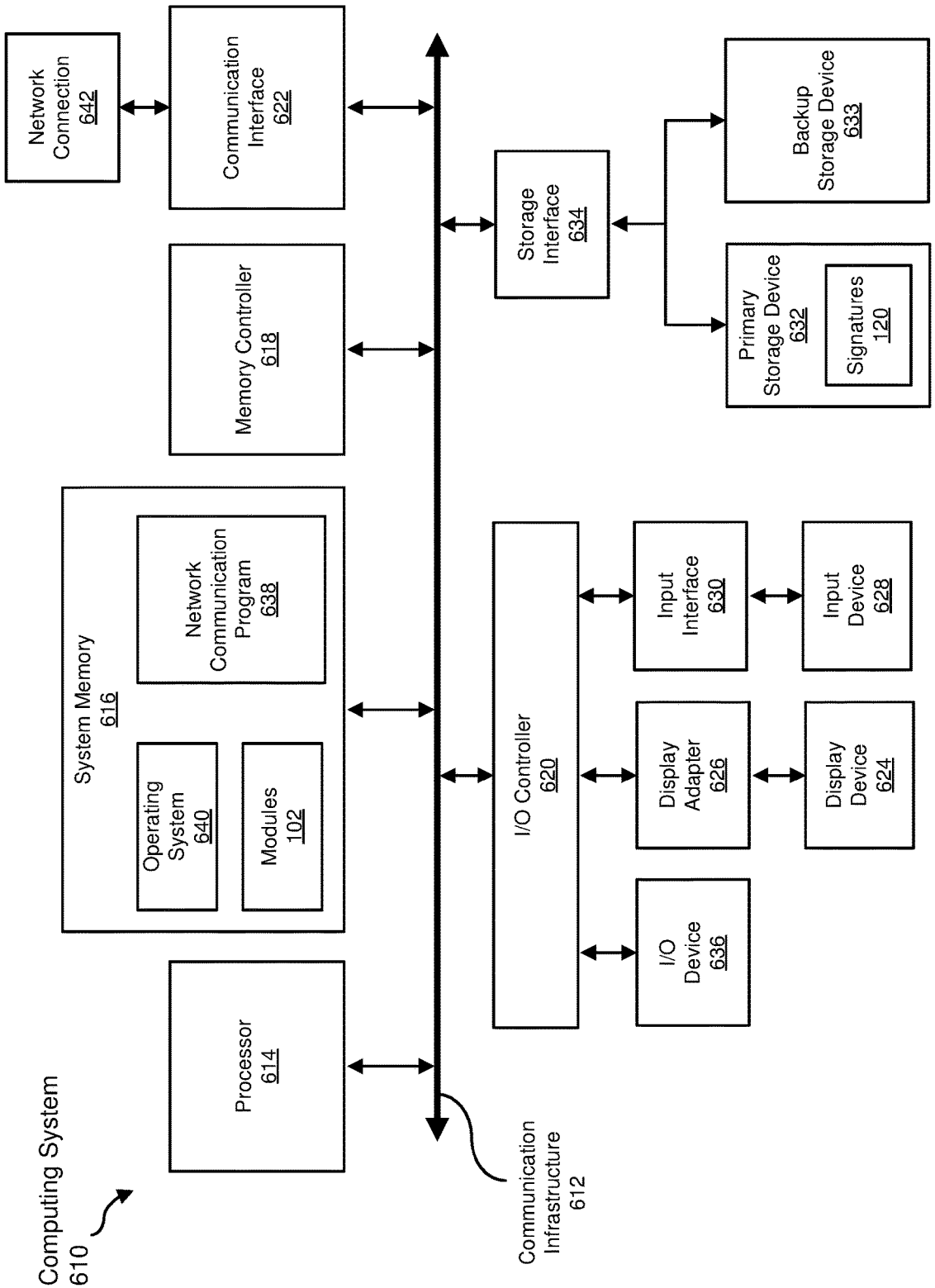
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 5). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, behavioral signatures 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
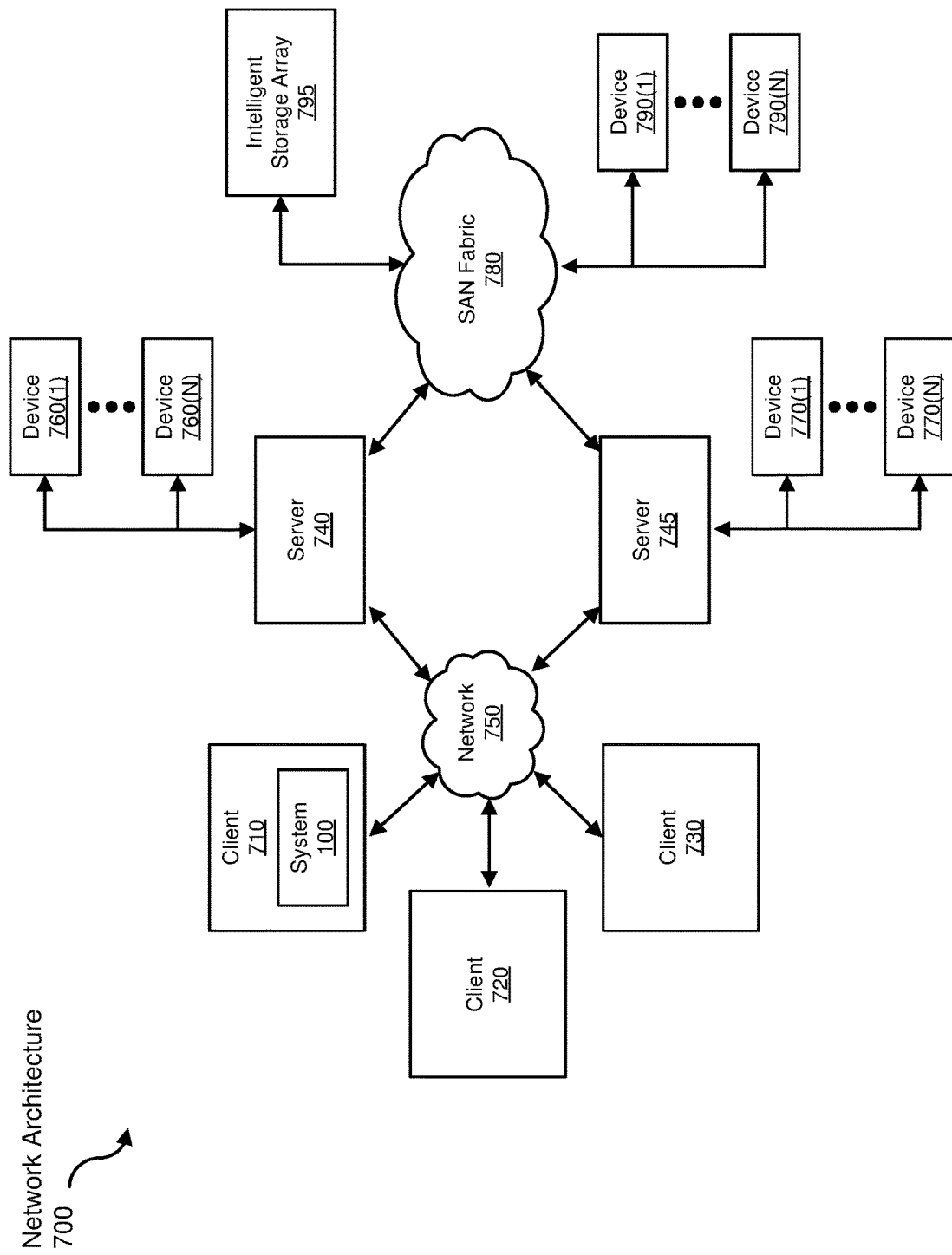
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 5). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for detecting preparatory-stages of row-hammer attacks.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive behavioral signatures to be transformed, transform the behavioral signatures into a detection of a preparatory stage of a rowhammer attack, output a result of the transformation to a security system, use the result of the transformation to prevent the rowhammer attack from succeeding, and store the result of the transformation to a system for storing information about rowhammer attacks. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting preparatory-stages of rowhammer attacks, at least a portion of the method being performed by a computing device comprising at least one processor, the method comprising:
   receiving, at the computing device, signatures of preparatory behaviors that are known to be exhibited by malicious virtual machines when preparing to perform rowhammer attacks, wherein:
      the computing device hosts a plurality of virtual machines; and
      at least one page of virtual memory of each of the plurality of virtual machines is mapped to at least one shared page frame of physical memory of the computing device;
   while the plurality of virtual machines have simultaneous read-only access to at least one shared page frame of the physical memory:
      monitoring, at the computing device, behaviors of each of the plurality of virtual machines;
      detecting, at the computing device while monitoring behaviors of the plurality of virtual machines, a behavior of at least one of the plurality of virtual machines that matches one of the signatures of preparatory behaviors; and
      performing, in response to detecting the behavior, a security action to prevent the at least one of the plurality of virtual machines from perpetrating a successful rowhammer attack.

2. The computer-implemented method of claim 1, wherein the signatures of preparatory behaviors comprise signatures of preparatory behaviors that are known to be exhibited by malicious virtual machines during preparatory stages of flip-feng-shui attacks.

3. The computer-implemented method of claim 1, wherein the signatures of preparatory behaviors comprise a signature of controlling a layout of page frames in the physical memory in a way that is known to enable malicious virtual machines to perpetrate rowhammer attacks.

4. The computer-implemented method of claim 1, wherein the signatures of preparatory behaviors comprise a signature of mapping the page frame in the physical memory to the page of virtual memory in a way that is known to enable malicious virtual machines to perpetrate rowhammer attacks.

5. The computer-implemented method of claim 1, wherein the signatures of preparatory behaviors comprise a signature of reading from the page of virtual memory in a way that is known to enable malicious virtual machines to identify portions of the physical memory that are vulnerable to bit flipping.

6. The computer-implemented method of claim 1, wherein the signatures of preparatory behaviors comprise a signature of reading from the page of virtual memory that is mapped to the page frame of the physical memory in a way that is known to enable malicious virtual machines to identify an alignment of the page frame within the physical memory.

7. The computer-implemented method of claim 1, wherein the signatures of preparatory behaviors comprise a signature of aligning the page frame of the physical memory to the physical memory in a way that is known to enable malicious virtual machines to perpetrate rowhammer attacks.

8. The computer-implemented method of claim 1, wherein the signatures of preparatory behaviors comprise a signature of making the page frame of the physical memory more likely to be shared with other virtual machines.

9. The computer-implemented method of claim 1, wherein the signatures of preparatory behaviors comprise a signature of writing to the page of virtual memory in a way that is known to enable a malicious virtual machine to maintain control of the page frame of the physical memory to which the page of virtual memory is mapped.

10. The computer-implemented method of claim 1, wherein the signatures of preparatory behaviors comprise a signature of causing page frames to be allocated continuously in the physical memory.

11. The computer-implemented method of claim 1, wherein performing the security action comprises flagging the at least one of the plurality of virtual machines as a possible perpetrator of a rowhammer attack.

12. The computer-implemented method of claim 1, wherein performing the security action comprises flagging the at least one of the plurality of virtual machines for forensic examination.

13. The computer-implemented method of claim 1, wherein performing the security action comprises shutting down the at least one of the plurality of virtual machines.

14. The computer-implemented method of claim 1, wherein performing the security action comprises preventing the at least one of the plurality of virtual machines from sharing page frames with any other virtual machine.

15. The computer-implemented method of claim 1, wherein performing the security action comprises assigning the at least one of the plurality of virtual machines to a group of untrusted virtual machines that cannot share page frames with trusted virtual machines.

16. A system for detecting preparatory-stages of rowhammer attacks, the system comprising:
- a receiving module, stored in memory, that receives, at a hypervisor, signatures of preparatory behaviors that are known to be exhibited by malicious virtual machines when preparing to perform rowhammer attacks, wherein:
  - the hypervisor hosts a plurality of virtual machines; and
  - at least one page of virtual memory of each of the plurality of virtual machines is mapped to at least one shared page frame of physical memory of the hypervisor;
- a monitoring module, stored in memory, that monitors, at the hypervisor while the plurality of virtual machines have simultaneous read-only access to at least one shared page frame, behaviors of each of the plurality of virtual machines;
- a detecting module, stored in memory, that detects, at the hypervisor while monitoring behaviors of the plurality of virtual machines and while the plurality of virtual machines have simultaneous read-only access to at least one shared page frame, a behavior of one of the plurality of virtual machines that matches one of the signatures of preparatory behaviors;
- a security module, stored in memory, that performs, in response to detecting the behavior that matches one of the signatures of preparatory behaviors while the plurality of virtual machines have simultaneous read-only access to at least one shared page frame, a security action to prevent the at least one of the plurality of virtual machines from perpetrating a successful rowhammer attack; and
- at least one physical processor that executes the receiving module, the monitoring module, the detecting module, and the security module.

17. The system of claim 16, wherein the signatures of preparatory behaviors comprise signatures of preparatory behaviors that are known to be exhibited by malicious virtual machines during preparatory stages of flip-feng-shui attacks.

18. The system of claim 16, wherein the signatures of preparatory behaviors comprise at least one of:
- a signature of controlling a layout of page frames in the physical memory in a way that is known to enable malicious virtual machines to perpetrate rowhammer attacks;
- a signature of mapping the page frame in the physical memory to the page of virtual memory in a way that is known to enable malicious virtual machines to perpetrate rowhammer attacks;
- a signature of reading from the page of virtual memory in a way that is known to enable malicious virtual machines to identify portions of the physical memory that are vulnerable to bit flipping;
- a signature of reading from the page of virtual memory that is mapped to the page frame of the physical memory in a way that is known to enable malicious virtual machines to identify an alignment of the page frame within the physical memory;
- a signature of aligning the page frame of the physical memory to the physical memory in a way that is known to enable malicious virtual machines to perpetrate rowhammer attacks;
- a signature of making the page frame of the physical memory more likely to be shared with other virtual machines;
- a signature of writing to the page of virtual memory in a way that is known to enable a malicious virtual machine to maintain control of the page frame of the physical memory; and
- a signature of causing page frames to be allocated continuously in the physical memory.

19. The system of claim 16, wherein the security module performs the security action by performing at least one of:
- flagging the at least one of the plurality of virtual machines as a possible perpetrator of a rowhammer attack;
- flagging the at least one of the plurality of virtual machines for forensic examination;
- shutting down the at least one of the plurality of virtual machines;
- preventing the at least one of the plurality of virtual machines from sharing page frames with any other virtual machine; and
- assigning the at least one of the plurality of virtual machines to a group of untrusted virtual machines that cannot share page frames with trusted virtual machines.

20. A non-transitory computer-readable medium comprising one or more computer-executable instructions that, when executed by at least one processor of a computing device, cause the computing device to:
- receive, at the computing device, signatures of preparatory behaviors that are known to be exhibited by malicious virtual machines when preparing to perform rowhammer attacks, wherein:
  - the computing device hosts a plurality of virtual machines; and
  - at least one page of virtual memory of each of the plurality of virtual machines is mapped to at least one shared page frame of physical memory of the computing device;

monitor, at the computing device while the plurality of virtual machines have simultaneous read-only access to at least one shared page frame of the physical memory, behaviors of each of the plurality of virtual machines;

detect, at the computing device while monitoring behaviors of the plurality of virtual machines and while the plurality of virtual machines have simultaneous read-only access to at least one shared page frame of the physical memory, a behavior of one of the plurality of virtual machines that matches one of the signatures of preparatory behaviors; and perform, in response to detecting the behavior that matches one of the signatures of preparatory behaviors while the plurality of virtual machines have simultaneous read-only access to at least one shared page frame of the physical memory, a security action to prevent the virtual machine from perpetrating a successful rowhammer attack.

\* \* \* \* \*